United States Patent
Bohm

[11] Patent Number: 5,907,092
[45] Date of Patent: May 25, 1999

[54] COUNTERCURRENT SNIFFING LEAK DETECTOR

[75] Inventor: Thomas Bohm, Cologne, Germany

[73] Assignee: Leybold Aktiengesellschaft, Germany

[21] Appl. No.: 08/849,372

[22] PCT Filed: Sep. 9, 1995

[86] PCT No.: PCT/EP95/03554

§ 371 Date: Jun. 6, 1997

§ 102(e) Date: Jun. 6, 1997

[87] PCT Pub. No.: WO96/19721

PCT Pub. Date: Jun. 27, 1996

[30] Foreign Application Priority Data

Dec. 22, 1994 [DE] Germany .............. 44 45 829

[51] Int. Cl.⁶ .............................................. G01M 3/04
[52] U.S. Cl. ............................................... 73/40.7
[58] Field of Search ............... 73/40.7, 40, 1.03

[56] References Cited

U.S. PATENT DOCUMENTS

| 3,690,151 | 9/1972 | Briggs | 73/40.7 |
|---|---|---|---|
| 4,472,962 | 9/1984 | Mennenga | 74/40.7 |
| 4,499,752 | 2/1985 | Fruzzetti et al. | 73/40.7 |
| 4,735,084 | 4/1988 | Fruzzetti | 73/40.7 |
| 4,779,449 | 10/1988 | Bley et al. | 73/40.7 |
| 4,794,784 | 1/1989 | Bley | 73/1 G |
| 5,301,537 | 4/1994 | Atkinson . | |
| 5,537,857 | 7/1996 | Grosse Bley | 73/40.7 |
| 5,585,548 | 12/1996 | Grosse Bley et al. | 73/40.7 |

FOREIGN PATENT DOCUMENTS 0242684 of 1987 European Pat. Off. .
2283431 of 1976 France .

Primary Examiner—Hezron Williams
Assistant Examiner—Jay L. Politzer
Attorney, Agent, or Firm—Wall Marjama Bilinski & Burr

[57] ABSTRACT

The invention relates to a countercurrent sniffing leak detector (1) with a mass spectrometer (3) as the detector, with a high-vacuum pump (4) or high-vacuum pump stage (14) through which flows a test gas in countercurrent, with a sniffing hose (7) connected to the outlet side of the high-vacuum pump, respectively high-vacuum pump stage, and with a choke maintaining the pressure difference between the atmospheric pressure in the inlet region (8) of the sniffing hose (7) and the pressure in its outlet region (9); to improve the sensitivity and response time it is suggested that at least one segment of the sniffing hose (7), preferably the entire sniffing hose (7), is dimensioned such that the desired choking is achieved.

10 Claims, 1 Drawing Sheet

COUNTERCURRENT SNIFFING LEAK DETECTOR

BACKGROUND OF THE INVENTION

The invention relates to a countercurrent sniffing leak detector including a mass spectrometer as a test gas detector, a high-vacuum pump or high-vacuum pump stage through which a test gas flows in countercurrent, a sniffing hose connected to the outlet side of the high-vacuum pump, or high-vacuum pump stage, respectively and a choke maintaining the pressure difference between atmospheric pressure in the inlet region of the sniffing hose and the pressure in the outlet region of the sniffing hose.

In order to attain in a leak detector of this type a short response time as well as high detection sensitivity, it is suggested that the sniffing hose is implemented such that the desired choking is achieved.

Through this measure it is achieved that the maximum allowed gas stream always passes through the sniffing hose. Since the leaks which are of interest in the helium test gas leak detection are on the order of magnitude of $10^2$ mbars/l/sec, it is ensured that the entire test gas stream escaping from a potentially present leak, is suctioned in and is transported into the leak detector. This results in a high detection sensitivity. Since, moreover, the flow rate in the sniffing hose, dimensioned according to the invention, is relatively high, a short response time also results. The cited advantages are attained especially well if the sniffing hose has a uniform diameter over its entire length so that it effects overall the desired choking. However, to solve the posed task it is already sufficient if only a relatively large segment of the sniffing hose, for example 50 or 75% of its length, has a choking function while the remaining segment conducts the gas to be investigated to the leak detector without significant resistance.

Sniffing leak detectors are known per se from DE-B-24 41 124. In this version of prior art described in this document, in the inlet region of the sniffing hose a choke is provided. The sniffing leak detector according to Patent Claim 1 of the cited document comprises a choke which is disposed directly in front of the mass spectrometer detector. In both versions it is unavoidable that a portion of the test gas streaming from a potentially present leak is carried into the inlet of the leak detector.

SUMMARY OF THE INVENTION

Within the scope of the present invention a special advantage is obtained with respect to calibration. In a sniffing leak detector of the type according to the invention it is sufficient if for the purpose of calibration a known quantity of test gas is introduced with the aid of a test leak in the region of the connection line between the high-vacuum pump and forevacuum pump. The calibration with an external test leak which up to now has been necessary with sniffing leak detectors, becomes superfluous.

BRIEF DESCRIPTION OF THE DRAWINGS

Further advantages and details will be explained in conjunction with FIGS. 1 and 2 wherein.

Figure 1:
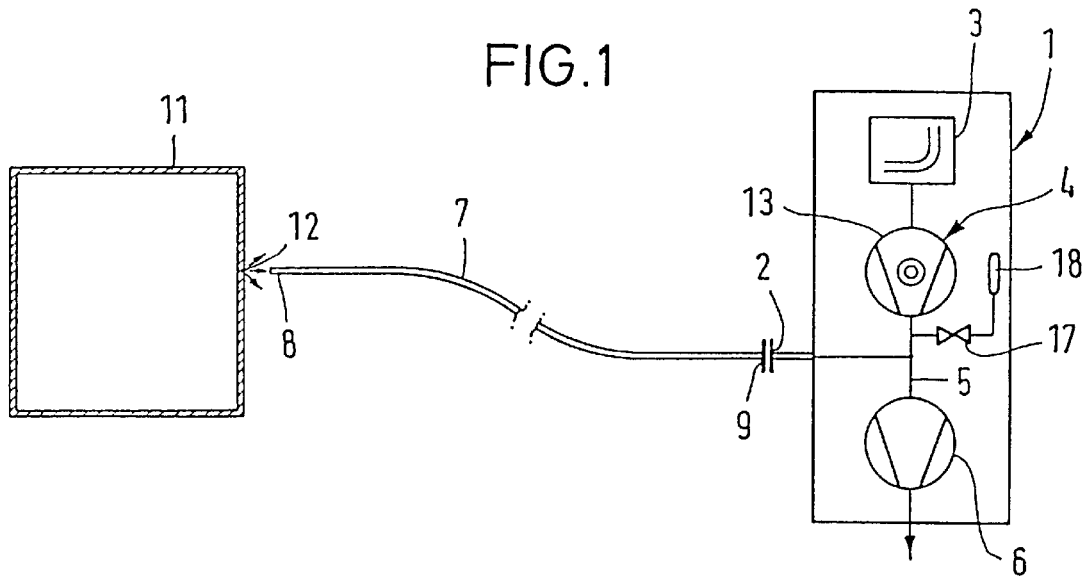
FIG. 1 is a schematic view showing a leak detector embodying the teachings of the present invention.
Figure 2:
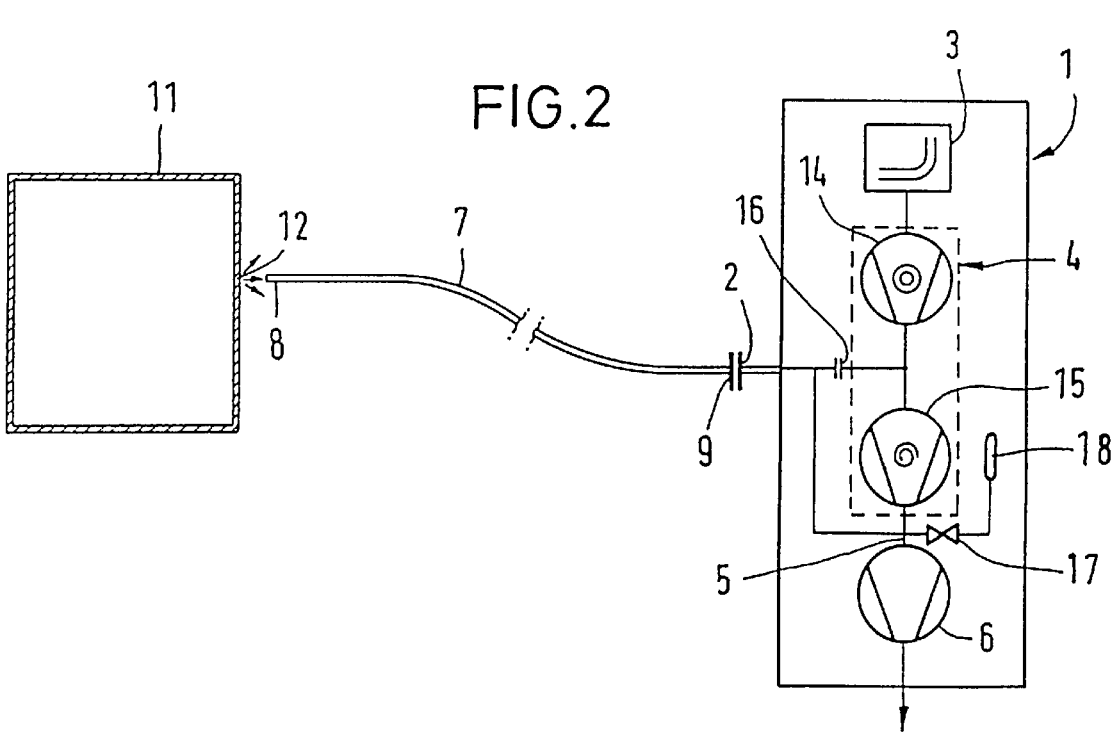
FIG. 2 is a schematic view showing a further embodiment of the invention.

In both FIGS. 1 and 2 the schematically depicted leak detector device is denoted by 1, its input by 2. It comprises a mass spectrometer 3 connected with the inlet of a high-vacuum pump 4, preferably a turbomolecular pump. The high-vacuum pump 4 is connected with a connection line 5 to a forevacuum pump 6.

DESCRIPTION OF THE INVENTION

A sniffing hose 7 is connected to the inlet 2 of the leak detector 1. The two ends of the sniffing hose are denoted by 8 (inlet) and 9 (outlet). With its inlet region 8 the sniffing hose is guided over the region suspected of having a leak of a test sample 11. A leak is depicted and denoted by 12.

In the case of the leak detector according to FIG. 1, the inlet 2 of the leak detector 1 is connected to connection line 5. A turbomolecular vacuum pump 13 is selected as the high-vacuum pump 4 operated in countercurrent is selected.

In the case of the leak detector according to FIG. 2 the high-vacuum pump 4 comprises a stage 14 (preferably a turbomolecular pump stage) disposed on the side of the high vacuum and a stage 15 (preferably a molecular pump stage) disposed on the side of the forvacuum. The high-vacuum pump 4 is equipped with a connection 16 which is connected with the region between the high-vacuum pump stages 14 and 15. The inlet 2 of the leak detector 1 can optionally be connected (with the aid of valves, not shown) to the connection line 5 between high-vacuum pump 4 and forepump 6 or, to increase the sensitivity, to the inlet 16 of the high-vacuum pump 4.

The dimensions of the sniffing hose 7 (length, inner diameter), are selected such that it has the capability of maintaining the pressure difference between the atmospheric pressure in its inlet region 8 and the pressure in the region of the outlet 9. The pressure in the region of the outlet 9 is approximately 2 mbars if the inlet 2 of the leak detector 1 is connected to the connection line between high-vacuum pump 4 and forevacuum pump 6 (FIG. 1). If the inlet 2 of the leak detector 1 is connected to the connection 16 of the high-vacuum pump 4 (FIG. 2), the pressure in the outlet region 9 of the sniffing hose 7 is approximately 0.1 bar. A sniffing hose 7 having a length of approximately 4 m with an inner diameter of approximately 0.4 mm has the desired choke effect. In such a sniffing hose, a gas throughflow of approximately 0.4 mbar/L/sec results. With a relatively long sniffing hose 7 a greater inner diameter must be selected and with a relatively short sniffing hose a smaller inner diameter must be selected.

To the connection line 5 between the high-vacuum pump 4 and the forevacuum pump 6 is additionally connected a test leak 18 via a valve 17. Because of the special properties of the sniffing hose 7 it is sufficient if the calibration of the leak detector is carried out with the installed test leak 18. Calibration with an external test leak is no longer required.

I claim:

1. A countercurrent sniffing leak detector comprising:

a mass spectrometer;

a high vacuum pump having an inlet connected to said mass spectrometer and an outlet;

a forevacuum pump connected to said outlet of said high vacuum pump via a conduit;

a sniffing hose having an inlet at its distal end and an outlet at its proximal end, said outlet of said sniffing hose being coupled to said conduit, wherein at least fifty percent of the length of said sniffing hose is dimensioned with a uniform diameter to establish a choke for maintaining a desired pressure difference between the atmospheric pressure at the inlet end of said sniffing hose and the pressure at the outlet end of said sniffing hose.

2. The leak detector of claim 1, wherein said outlet of said sniffing hose is coupled to said conduit without an interposed choke.

3. The leak detector of claim 1, wherein said high vacuum pump includes a turbomolecular pump.

4. The leak detector of claim 1, further comprising leak test means selectively coupled to said conduit by valve means.

5. The leak detector of claim 1, wherein said sniffing hose has a length of 4 m and an inside diameter of 0.4 mm.

6. A countercurrent sniffing leak detector comprising:

a mass spectrometer;

a high vacuum pump stage having an inlet connected to said mass spectrometer, a first pump, a second pump connected to said first pump by an intermediate conduit, and an outlet;

a forevacuum pump connected to said outlet of said high vacuum pump stage via a conduit;

a sniffing hose having an inlet at its distal end and an outlet at its proximal end, said outlet of said sniffing hose being coupled to said intermediate conduit, wherein at least fifty percent of the length of said sniffing hose is dimensioned with a uniform diameter to establish a choke for maintaining a desired pressure difference between the atmospheric pressure at the inlet end of said sniffing hose and the pressure at the outlet end of said sniffing hose.

7. The leak detector of claim 6, wherein said outlet of said sniffing hose is coupled to said intermediate conduit without an interposed choke.

8. The leak detector of claim 6, wherein said first pump is a turbomolecular pump and said second pump is a molecular pump.

9. The detector of claim 6, further comprising leak test means selectively coupled to said conduit by valve means.

10. The leak detector of claim 6 wherein said sniffing hose has a length of 4 m and an inside diameter of 0.4 mm.

* * * * *